(12) United States Patent
Wehner

(10) Patent No.: US 7,086,952 B2
(45) Date of Patent: Aug. 8, 2006

(54) PROPSHAFT BOOT WITH INTEGRATED BEARING SEAL DEFLECTOR AND CLAMPLESS RETENTION

(75) Inventor: Robert J Wehner, Farmington Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 10/686,912

(22) Filed: Oct. 16, 2003

(65) Prior Publication Data

US 2005/0085305 A1    Apr. 21, 2005

(51) Int. Cl.
*F16C 1/26* (2006.01)

(52) U.S. Cl. .................................. 464/175; 29/428
(58) Field of Classification Search ............... 403/50, 403/51, 223; 464/173, 175; 277/634–636; 29/428
See application file for complete search history.

(56) References Cited

U.S. PATENT DOCUMENTS

| | | | |
|---|---|---|---|
| 2,308,073 A | 1/1943 | Hagerty | |
| 3,262,706 A * | 7/1966 | Hassan | 464/175 |
| 3,403,917 A * | 10/1968 | MacSpadden, Jr. | 277/636 |
| 3,830,083 A | 8/1974 | Hadick et al. | |
| 4,443,207 A | 4/1984 | Buthe et al. | |
| 4,456,269 A * | 6/1984 | Krude et al. | 464/175 X |
| 4,556,400 A | 12/1985 | Krude et al. | |
| 4,826,466 A | 5/1989 | Triquet | |
| 4,926,979 A * | 5/1990 | Odaka | 277/636 X |
| 4,957,469 A | 9/1990 | Zollinger | |
| 5,176,576 A * | 1/1993 | Moulindt | 277/636 X |
| 5,183,351 A | 2/1993 | Schneider | |
| 5,451,186 A | 9/1995 | Poulin et al. | |
| 5,851,476 A | 12/1998 | Wydra et al. | |
| 5,853,178 A | 12/1998 | Wydra et al. | |
| 6,165,076 A | 12/2000 | Mossman | |
| 6,171,010 B1 | 1/2001 | Nagashima et al. | |
| 6,179,717 B1 | 1/2001 | Schwarzler | |
| 6,319,132 B1 * | 11/2001 | Krisher | 464/175 X |
| 6,361,444 B1 * | 3/2002 | Cheney et al. | 464/175 |
| 6,540,618 B1 * | 4/2003 | MacDonald et al. | 464/173 |
| 6,814,521 B1 * | 11/2004 | Suzuki et al. | 277/635 X |
| 2004/0256814 A1 * | 12/2004 | Creek | 277/634 |

FOREIGN PATENT DOCUMENTS

| | | | | |
|---|---|---|---|---|
| FR | 2592111 | * | 6/1987 | 464/175 |
| JP | 2002 235771 A | | 8/2002 | |
| JP | 10 331879 A | | 12/2002 | |

* cited by examiner

*Primary Examiner*—Greg Binda
(74) *Attorney, Agent, or Firm*—Harness, Dickey & Pierce, P.L.C.

(57) ABSTRACT

A boot seal for a mechanical joint with a rotary joint member. The boot seal includes a flexible body portion and a flange end that is coupled to an end of the body portion. The flange end includes a flange seal portion, which is configured to seal against the joint member in an axial direction, and an annular lip that extends circumferentially about the seal portion and shields the flange seal portion from debris and moisture.

7 Claims, 2 Drawing Sheets

PROPSHAFT BOOT WITH INTEGRATED BEARING SEAL DEFLECTOR AND CLAMPLESS RETENTION

FIELD OF THE INVENTION

The present invention generally relates to mechanical joints for transmitting rotary power and more particularly to a boot seal with improved sealing and coupling characteristics.

BACKGROUND OF THE INVENTION

Mechanical joints for transmitting rotary power, such as an externally splined shaft that is matingly engaged to an internally splined shaft, frequently utilize a boot seal for covering the power transmitting members of the mechanical joint. Conventional boot seals include a pair of coupling portions that are coupled to the opposite sides of a body portion. The body portion is usually configured with bellows, convolutions or similar means to permit the coupling portions to move axially relative to one another. The coupling portions generally include a circumferentially-extending groove that is configured to receive a metallic or plastic boot clamp. The boot clamp is employed to retain the coupling portion to a power transmitting member of the mechanical joint (typically to an input member or an output member) secure the boot seal to the power transmitting members.

While such designs have generally been successful in protecting the power transmitting joint members from contact with debris and moisture, those skilled in the art will appreciate that an improved boot seal is highly desirable. In this regard, it is highly desirable that assembly of the boot seal to the power transmitting joint members be more efficient and require relatively less tooling. Furthermore, it is not uncommon for debris and moisture to travel through the open end of a boot seal where the debris and moisture contribute to wear and/or corrosion. Accordingly, there remains a need in the art for an improved boot seal which better resists the infiltration of debris and moisture through the open end of the boot seal.

SUMMARY OF THE INVENTION

In one preferred form, the present invention provides a boot seal for a mechanical joint with a rotary joint member. The boot seal includes a flexible body portion and a flange end that is coupled to an end of the body portion. The flange end includes a flange seal portion, which is configured to seal against the joint member in an axial direction, and an annular lip that extends circumferentially about the seal portion and shields the flange seal portion from debris and moisture. The annular lip is preferably configured such that the debris and moisture are expelled from the area proximate the annular lip. The flange seal portion preferably resiliently and sealingly engages the rotary joint member to permit the seal boot to be coupled to the rotary joint member without resort to conventional boot clamps.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
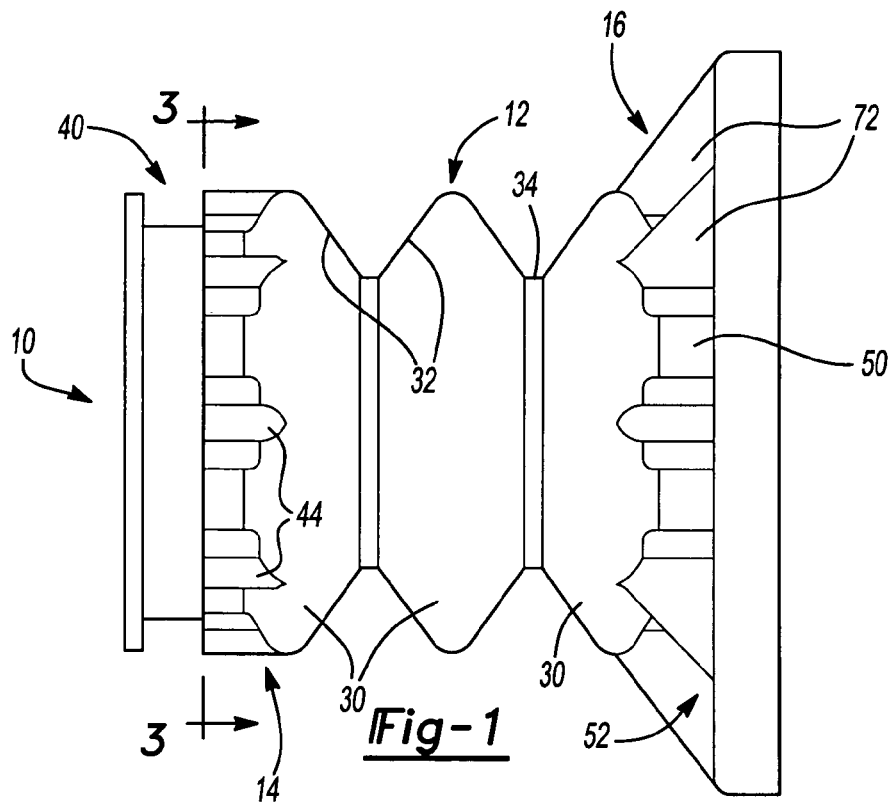
FIG. 1 is a top plan view of a boot seal constructed in accordance with the teachings of the present invention.
Figure 3:
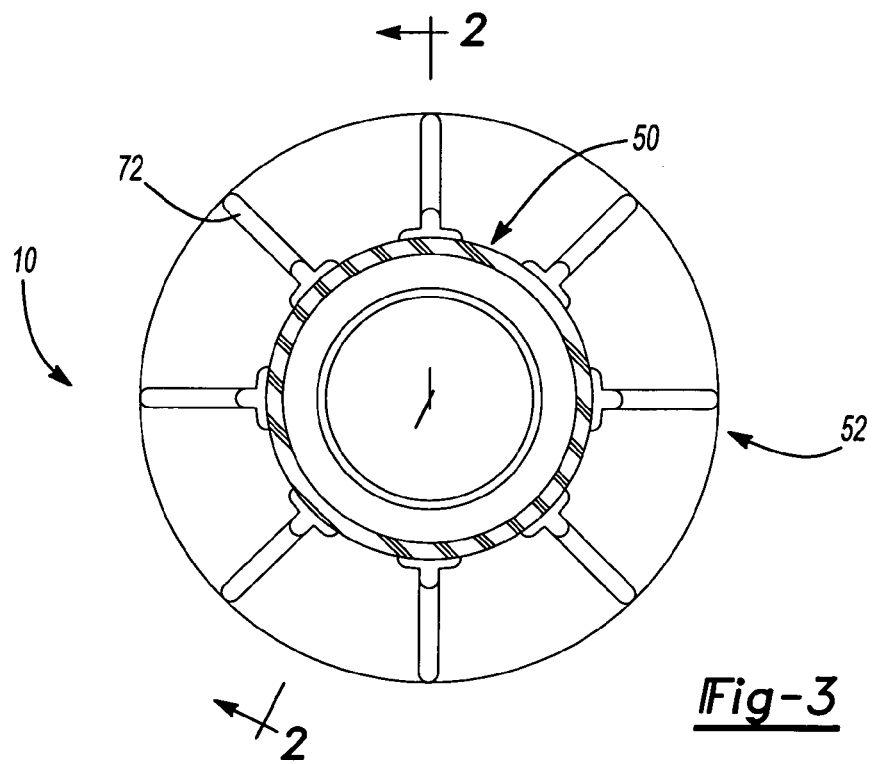
FIG. 3 is a sectional view taken along the line 3—3 of FIG. 1.
Figure 2:
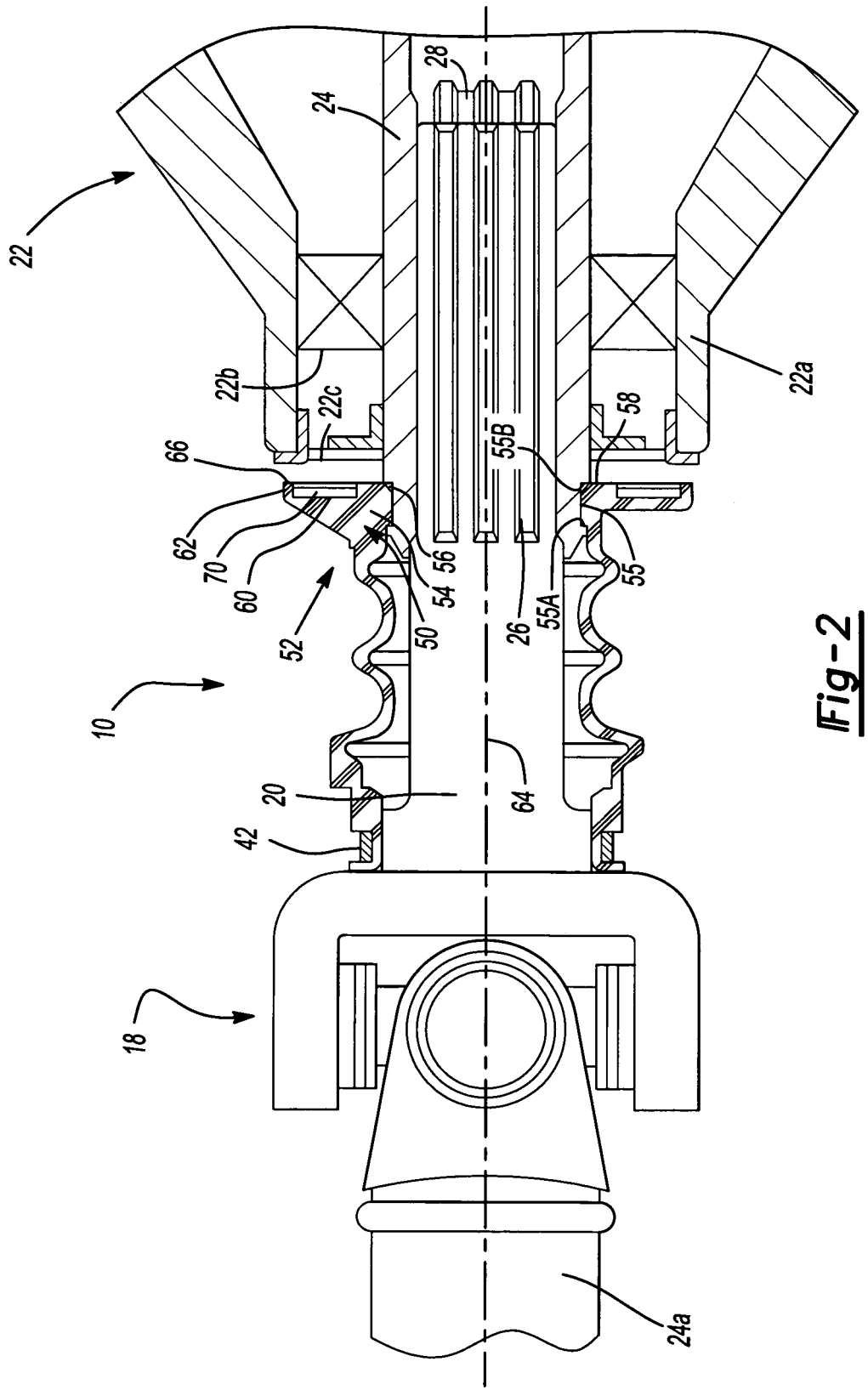
FIG. 2 is a longitudinal section view of the boot seal of FIG. 1 shown in operative association with a pair of rotating joint members.

With reference to FIGS. 1 through 3 of the drawings, a boot seal constructed in accordance with the teachings of the present invention is generally indicated by reference numeral 10. The boot seal 10 is unitarily formed from a resilient material, such as natural or synthetic rubber or a suitable plastic, and is illustrated to include a flexible body portion 12, a coupling end 14 and a flange end 16. The boot seal 10 is shown in FIG. 2 in conjunction with a mechanical joint 18 for transmitting rotary power. The mechanical joint 18 includes a first member, which is the internally splined output shaft 24 of a transfer case 22 in the particular example provided, and a second member, which is an externally splined shaft 20 that is associated with a propshaft 24a in the particular example provided. Those of ordinary skill in the art will appreciate that the interally splined output shaft 24 and the externally splined shaft 20 are slidably connected to one another. Although the exemplary splined shaft 20 is illustrated to include splined elements 26 that matingly engage mating splined elements 28 that are formed on the splined output shaft 24, those skilled in the art will understand that various other means may be employed to couple the members of the mechanical joint 18 to facilitate the transmission of rotary power therebetween. Accordingly, the particular embodiment illustrated is not intended in any way to limit the scope of the present invention.

Returning to FIGS. 1 through 3, the flexible body portion 12 is conventionally illustrated to include a plurality of convolutions 30 having angular sidewalls 32 that extend radially inward into connection at annular roots 34. The annular roots 34 form live hinges that facilitate flexure and axial movement of the body portion 12 (i.e., compression and extension of the body portion 12) during the operation of the mechanical joint 18.

The coupling end 14 is coupled to a first end of the body portion 12 and is illustrated to include an annular clamp flange 40 that is sized to receive a conventional boot clamp 42, such as a boot clamp that is shown in U.S. Pat. No. 3,402,436 to Oetiker, the disclosure of which is hereby incorporated by reference as if fully set forth herein. The inside diameter of the coupling end 14 is sized to engage the splined shaft 20 in a slip-fit manner. Tightening of the boot clamp 42 secures the coupling end 14 to the splined shaft 20 to thereby inhibit relative rotation therebetween. A plurality of radially extending ribs 44, which are coupled at a proximal end to the flexible body portion 12, serve to increase the strength and rigidity of the coupling end 14.

The flange end 16 is coupled to a second end of the body portion 12 opposite the coupling end 14. The flange end 16 is illustrated to include a flange seal portion 50 and an annular lip 52. The flange seal portion 50 is configured to create a primary seal against the output shaft 24 to guard against the infiltration of moisture or debris into the body portion 12. In the particular embodiment illustrated, the flange seal portion 50 includes an attachment portion 54 that is configured to sealingly engage a mating groove 55 that is formed about the perimeter of the output shaft 24. As specifically shown in FIG. 2, the mating groove 55 includes a first sidewall 55A and a second sidewall 55B that is spaced apart from the first sidewall 55A in an axial direction along the output shaft 24. Those of ordinary skill in the art will appreciate that the mating groove 55 is illustrated in a condition where it is proximate but spaced apart from the axial end of the output shaft 24. Due to the resilient nature of the material from which the boot seal 10 is formed, the attachment portion 54 is configured to resiliently expand over the output shaft 24 during the installation of the boot seal 10 and thereafter constrict around the outside diameter of the output shaft 24 when aligned to the groove 55 to thereby frictionally engage the output shaft 24. As those of ordinary skill in the art will appreciate, because the attachment portion 54 is matingly engaged to the mating groove 55, the attachment portion 54 abuts the first sidewall 55A as specifically shown in FIG. 2 to thereby axially retain the flange seal portion 50 to the splined shaft 24. Construction in this manner is highly advantageous in that it eliminates the need for a conventional boot clamp. To aid the technician in installing the boot seal 10, a chamfer 56 may be formed on a leading edge 58 of the flange seal portion 50.

The annular lip 52 extends around the circumference of the flange seal portion 50 to thereby form a barrier that shields the flange seal portion 50 from debris and moisture that is splashed upwardly toward the transfer case 22 during the operation of a vehicle (not shown) incorporating the seal of the present invention. In the particular embodiment illustrated, the annular lip 52 is generally L-shaped, having a first portion 60, which extends generally radially outwardly from the flange seal portion 50, and a second portion 62 that is generally transverse to the first portion 60. The second portion 62, which is generally concentrically disposed about the longitudinal axis 64 of the flange seal portion 50, has an outside diameter that is preferably about twice the inside diameter of the flange seal portion 50. In the particular embodiment illustrated, a distal end 66 of the annular lip 52 extends axially away from the body portion 12 by a dimension that is about equal to a dimension by which the leading edge 58 of the flange seal portion 50 extends axially away from the body portion 12. For reasons that are discussed below, the barrier created by annular lip 52 need not have the same robustness and integrity as the seal that is created by the flange seal portion 50 (against the output shaft 20). In the example provided, the annular lip 52 is actually spaced apart from the housing 22a of the transfer case 22. A plurality of radially extending ribs 72 interconnect the annular lip 52 and at least one, but preferably both, of the body portion 12 and the flange seal portion 50.

Although a sealed bearing 22b is seated in the housing 22a of the transfer case 22 to prevent the infiltration of dust and moisture into the transfer case 22, the barrier provided by the annular lip 52 provides an additional measure of protection by generally preventing most debris and moisture from reaching the seal 22c of the bearing 22b. Additionally, since the beet seal 10 rotates with the joint members of the mechanical joint 18 (i.e., the externally splined shaft 20 and the output shaft 24 in the example provided) during the operation of the mechanical joint 18, centrifugal force will tend to expel any debris and/or moisture that works its way between the annular lip 52, the bearing seal 22c and the shaft 20 to thereby further ensure the integrity of the seal 22c.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention net be limited to the particular embodiment illustrated by the drawings and described in the specification as the best mode presently contemplated for carrying out this invention, but that the invention will include any embodiments falling within the foregoing description and the appended claims.

What is claimed is:

1. A mechanical joint consisting of:
   a first shaft having an axial end and an annular groove proximate the axial end, the annular groove having a first sidewall and a second sidewall that is spaced axially apart from the first sidewall;
   a second shaft;
   a housing having an aperture formed therein, the first shaft extending through the aperture and being rotatably supported by the housing;
   a set of splines coupled to one of the first and second shafts;
   a mating set of splines coupled to the other one of the first and second shafts, the mating set of splines being matingly engaged with the set of splines such that the first and second shafts are slidably but non-rotatably connected;
   a boot seal having a coupling end, a body portion, and a flange end, the coupling end being disposed about the second shaft and including a annular clamp flange, the coupling end being coupled to a first axial end of the body portion, the body portion including a plurality of convolutions, the flange end being coupled to a second, opposite end of the body portion and including a flange seal and an annular lip, the flange seal being received into the annular groove and abutting the first sidewall to thereby axially retain the flange seal to the first shaft in an axial direction, the flange seal constricting about the first shaft solely through resilient clampless constriction to thereby sealingly engage the first shaft, the annular lip having a first portion that extends generally radially outwardly of the flange seal and a second portion that is coupled to a distal end of the first portion and which extends circumferentially about the first shaft radially outwardly of the aperture in the housing, the second portion terminating at a location that is axially spaced apart from the housing; and
   a single boot clamp received in the annular clamp flange and non-rotatably coupling the coupling end to the second shaft.

2. The mechanical joint of claim 1, wherein a chamfer is formed on a leading edge of the flange seal.

3. The mechanical joint of claim 2, wherein the annular lip is generally L-shaped.

4. The mechanical joint of claim 3, wherein a plurality of ribs are coupled to the annular lip whereby the ribs stiffen the annular lip.

5. The mechanical joint of claim 4, wherein the ribs are coupled to the body portion, the flange portion or both the body portion and the flange portion.

6. A mechanical joint consisting of:
a first shaft having an axial end and an annular groove proximate the axial end, the annular groove having a first sidewall and a second sidewall that is spaced axially apart from the first sidewall;
a second shaft;
a housing having an aperture formed therein, the first shaft extending through the aperture and being rotatably supported by the housing;
a set of splines coupled to one of the first and second shafts;
a mating set of splines coupled to the other one of the first and second shafts, the mating set of splines being matingly engaged with the set of splines such that the first and second shafts are slidably but non-rotatably connected;
a boot seal having a coupling end, a body portion, and a flange end, the coupling end being disposed about the second shaft and including a U-shaped annular clamp flange, the coupling end being coupled to a first axial end of the body portion, the body portion including a plurality of convolutions, a plurality of radially extending ribs being coupled to the body portion and the coupling end, the flange end being coupled to a second, opposite end of the body portion and including a flange seal and an annular lip, the flange seal being received into the annular groove and abutting the first sidewall to thereby axially retain the flange seal to the first shaft in an axial direction, the flange seal constricting about the first shaft solely through resilient clampless constriction to thereby sealingly engage the first shaft, the annular lip having a first portion that extends generally radially outwardly of the flange seal and a second portion that is coupled to a distal end of the first portion and which extends circumferentially about the first shaft radially outwardly of the aperture in the housing, the second portion terminating at a location that is axially spaced apart from the housing; and
a single boot clamp received in the annular clamp flange and non-rotatably coupling the coupling end to the second shaft;
wherein a chamfer is formed on a leading edge of the flange seal;
wherein the annular lip is generally L-shaped; and
wherein a plurality of ribs are coupled to the annular lip whereby the ribs stiffen the annular lip, the ribs being coupled to the body portion, the flange portion or both the body portion and the flange portion.

7. A method of making a mechanical joint comprising:
providing a first shaft having an axial end and an annular groove spaced apart from the axial end, the annular groove having a first sidewall and a second sidewall that is spaced axially apart from the first sidewall, the first shaft including a set of splines;
providing a housing having an aperture formed therein;
rotatably supporting the first shaft in the housing such that a portion of the first shaft extends through the aperture;
providing a second shaft with a mating set of splines;
providing a boot seal having a coupling end, a body portion, and a flange end, the coupling end being disposed about the second shaft and including a U-shaped annular clamp flange, the body portion including a plurality of convolutions, the flange end being coupled to a second, opposite end of the body portion and including a flange seal and an annular lip, the annular lip having a first portion that extends generally radially outwardly of the flange seal and a second portion that is coupled to a distal end of the first portion;
assembling the boot seal to the second shaft such that the coupling end is coupled to a first axial end of the body portion;
engaging the splines and the mating splines to one another to slidably but non-rotatably couple the first and second shafts to one another;
assembling the boot seal to the first shaft such that the flange seal is received into the annular groove and abuts the first sidewall to thereby retain the flange seal to the first shaft in an axial direction, the flange seal constricting about the first shaft solely through resilient clampless constriction to thereby sealingly engage the first shaft, the second portion of the annular lip extending circumferentially about the first shaft radially outwardly of the aperture in the housing and terminating at a location that is axially spaced apart from the housing.

* * * * *